J. HOPKINSON.
LAST SLICE HOLDER.
APPLICATION FILED MAR. 20, 1917.
1,251,525.
Patented Jan. 1, 1918.
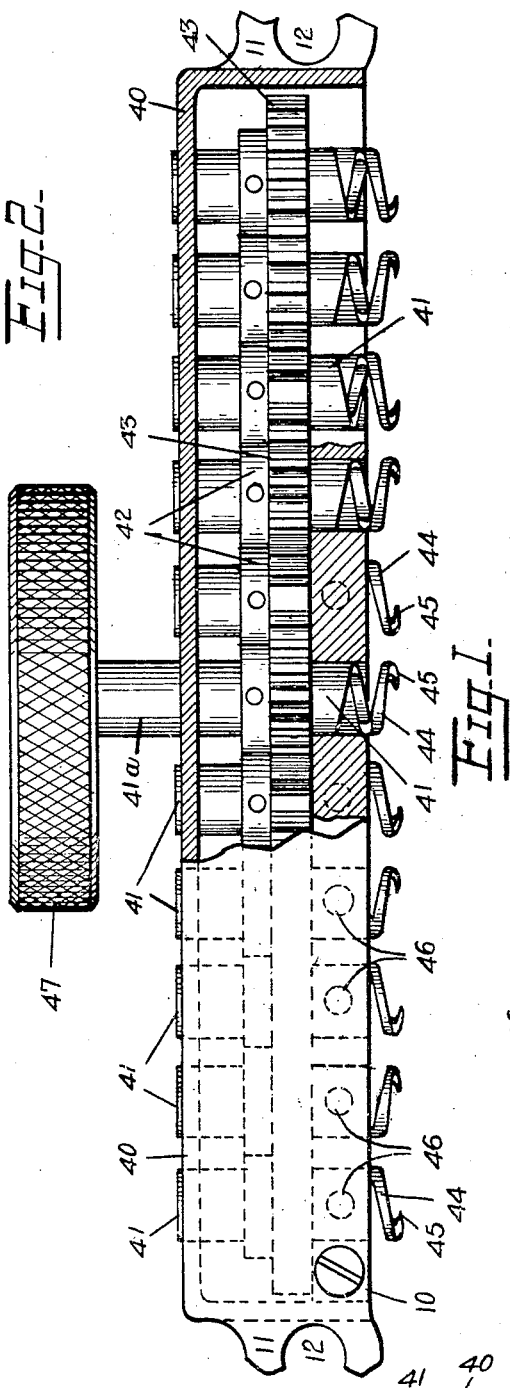
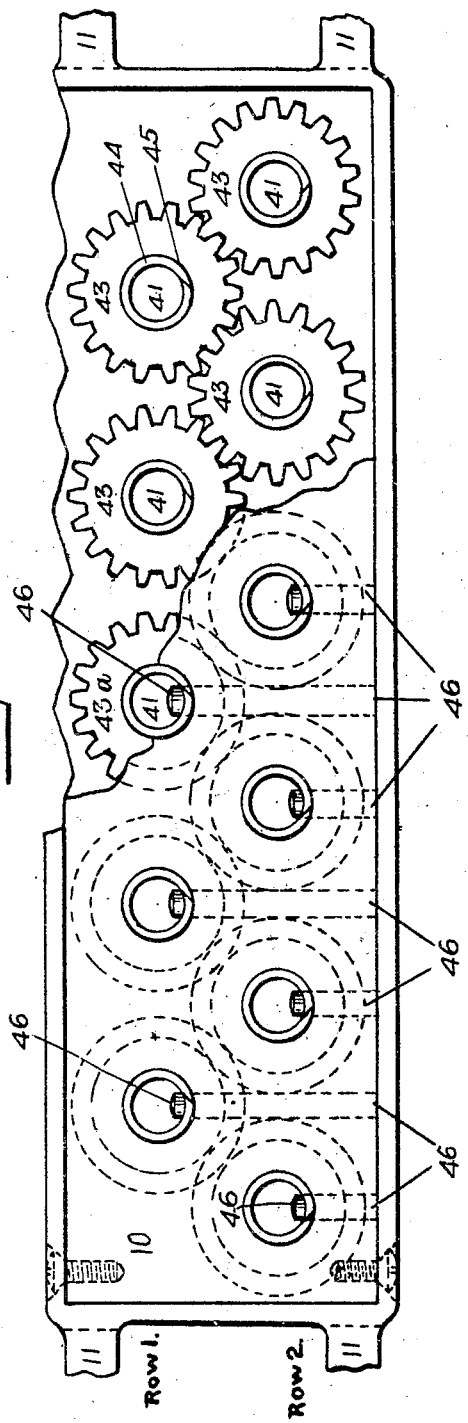
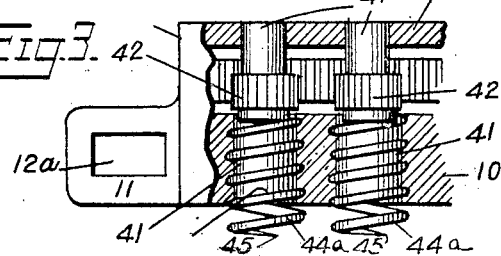
INVENTOR.
Joseph Hopkinson
By
Kerr Page Cooper + Hayward
ATTORNEYS.

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

LAST-SLICE HOLDER.

1,251,525.  Specification of Letters Patent.  Patented Jan. 1, 1918.

Original application filed August 6, 1915, Serial No. 43,914. Divided and this application filed March 30, 1917. Serial No. 155,998.

*To all whom it may concern:*

Be it known that I, JOSEPH HOPKINSON, a citizen of the United States, residing at Dayton, in the county of Montgomery and State of Ohio, have invented certain new and useful Improvements in Last-Slice Holders, of which the following is a full, clear, and exact description.

This invention relates to certain new and useful improvements in meat holders for meat slicing machines, and the present application is a divisional application of my co-pending application, Serial No. 43914, filed August 6, 1915, and allowed October 25, 1916. My improved meat holder is particularly adapted for holding the meat when the "last slice" is to be cut. Devices of this class are generally known as "last slice" holders, or meat end holders, and are substituted for the ordinary meat holders when butt ends of dried beef, sausage or bacon are to be sliced. The last slice holder grips the meat securely and allows the slicing machine to cut down to a very short distance from the end of the piece of meat. The use of last slice holders therefore effects a considerable economy to the user of a slicing machine, since it allows small pieces of meat to be sliced which ordinarily would be scrapped.

My device consists in certain improvements which permit the meat to be quickly placed upon the holder and after the meat is once in place it is securely held and prevented from accidentally slipping from position. In my improved holder the points of the meat retaining hooks or tangs are normally below the surface of the meat plate. This arrangement prevents the operator injuring his hands in placing the holder in position and in placing the meat upon the holder. When the meat holder is in position on the slicing machine and during the meat clamping operation, means are provided to advance the tangs beyond the plane of the meat plate to thereby grip the meat.

In the drawings:—

Figure 1 shows in elevation, my improved last slice holder. Certain parts of the plates are shown broken away to show the interior construction.

Fig. 2 is a top plan view of the holder shown in Fig. 1 with a portion of the casing broken away to show the interior construction.

Fig. 3 shows a modified method of attaching the tangs to the carrying studs.

In more detail, 10 is the meat plate, preferably attached by screws to a box like frame, having projecting therefrom the ears 11 which are apertured at 12. In placing the meat plate in position on the slicing machine, posts on the machine engage these apertures in the ears and hold the frame and meat plate in proper position thereon.

In Figs. 1 and 2 the apertures 12 are shown as being round, but it will be understood that these apertures may be square as shown at 12$^a$ in Fig. 3, if the posts on the slicing machine are square or rectangular in cross section. The box like frame has an integral rear plate 40. Plates 10 and 40 are bored with a number of co-axial holes to form bearing supports for carrying the studs 41. Intermediate the front and rear plates, each stud 41 has pinned thereto a collar 42, which has integrally secured thereto a pinion 43. The pinions 43 of the different studs mesh with one another as shown in Fig. 1. One particular stud 41 (namely 41$^a$) is extended a considerable distance beyond plate 40, and to this stud 41 is attached a knurled operating knob 47.

Although in Fig. 1, I have shown only two rows of studs 41, namely row 1 and 2, it is obvious that any number of rows of these studs may be provided depending upon the size of the meat plate and upon the size of the piece of meat to be held. In my co-pending application heretofore referred to I have shown four rows of these studs and I contemplate the use of an equal or greater number with the construction shown in this application. As all the studs 41 have secured thereto pinions 43, which enmesh with one another forming a complete gear train, it will be obvious upon turning knob 47 all of the studs 41 will be rotated. It will also be clear that the direction of rotation of the studs in row 1 will be opposite to the direction of rotation in row 2. If additional rows of studs are added, the direction of rotation of the studs in one row will be always in an opposite direction to the rotation of the studs in the adjacent rows. The front of each stud 41, (toward plate 10) is cut away to form a spiral tang 44 which finally terminates at a sharp point 45. The tangs in row 1 are left hand spirals and those in row 2 are right hand spirals. If additional rows are added the tangs in the adjacent rows are alternately left and right as will be readily understood. The tangs are cut in this left and right hand manner on account of the opposite direction of rotation of the studs in the adjacent rows, and this arrangement grips the meat or bacon in a more secure manner than if the direction of rotation was the same as with the studs in the adjacent rows.

To advance and retract the tangs with respect to the meat plate, I employ a number of pins 46 which project upward from the bottom of plate 10 and engage the spiral slots formed in the studs 41 between adjoining convolutions of the tangs 44. As these pins 46 are held in fixed position, they cause the tangs 44, the studs 41, pinions 43 and collar 42 to move relatively to the fixed plate 10 when the knob 47 is turned. It will be understood that when the parts are in normal position that the points 45 of the tangs 44 are below the surface of the plate 10. This prevents accidents in placing the last slice holder in position. In Fig. 2 the parts are shown in moved or advanced position, i. e., in the position they assume after the meat is secured to the tangs.

In the construction shown in Fig. 3, meat stud 41 is spirally slotted at its periphery to receive a spiral wire tang 44ᵃ. Meat plate 10 is similarly spirally slotted to receive the extending part of the spiral tang 44ᵃ. Consequently when the carrying stud 41 is rotated, the spiral tang itself becomes a thread and advances the stud 41 and carries the point 45 of the tang away or toward the meat plate.

It is to be understood that various modifications will occur to those skilled in the art, and what I claim as my invention is particularly pointed out in the appended claims.

I claim:—

1. In a last slice holder, in combination, a meat plate having a plurality of rows of apertures therein, a plurality of revoluble and axially slidable studs in said apertures, spiral tangs integral with said studs and projecting forwardly therefrom, a pinion on each of said studs, each said pinion intermeshing with another pinion upon another stud in such a manner as cause rotation of the studs in adjacent rows in opposite directions and rotation of all the studs of one row in the same direction, and means coöperating with the convolutions of the tangs to cause a co-axial advancing movement of the studs upon the rotation thereof and a concurrent rotation and projection of the tangs without the apertures in the meat plate.

2. In a last slice holder, in combination, a meat plate having a plurality of rows of apertures therein, revoluble and axially shiftable studs in said apertures, spiral tangs associated with the studs and projecting forwardly therefrom a back plate in which said studs are also journaled, a lengthy stud projecting rearwardly beyond the back plate, a handle thereon for rotating the said lengthy stud, a pinion on each of said studs, each said pinion intermeshing with an adjacent pinion in an adjoining row whereby upon rotation of the handle all said studs in one row are rotated in one direction and means coöperating with convolutions of the tangs for causing the tangs and studs to be axially advanced concurrently with the rotation thereof, whereby they project forwardly and engage the meat.

3. In a last slice holder, in combination, a meat plate, a back plate, studs journaled in said plates, spiral tangs associated with said studs, intermeshing pinions secured to said studs to cause a unison rotation of said studs and tangs upon the rotation of a single stud, and means for rotating said studs in unison, said means comprising a stud projecting through the rear plate, a handle thereon adapted to be manually rotated, and means for advancing the points of the tangs relatively to the meat plate, said means comprising fixed pins coöperating with the convolutions of the tangs, and means whereby all the studs in an adjacent row are rotated in the reverse direction.

4. A last slice holder for slicing machines comprising a meat plate, a series of revolubly mounted studs having at one end thereof and cut from the metal of the studs spiral meat holding tangs, said studs and tangs being arranged in separate parallel columns, means for rotating said studs and tangs in unison and for rotating the studs and tangs in adjacent columns in opposite directions to engage the meat and hold the same against the meat plate and means coöperating with the convolutions of the tangs and associated with a fixed part of the holder for causing the tangs to be advanced relatively to the meat plate upon the rotation thereof.

5. A last slice holder for slicing machines, comprising a meat plate, a series of revolubly mounted studs, each of said studs having at one end thereof and cut from the metal of the stud itself a spiral meat holding tang, means for rotating the studs and tangs in unison, and means associated with a fixed part of the device and coöperating with the convolutions of the tangs for causing the tangs to be advanced relatively to the meat plate upon the rotation thereof.

6. In a last slice holder, in combination, a plurality of rows of studs, the studs in one of the said rows being staggered in respect to the studs in the other row, pinions on each of the studs, each pinion intermeshing with a corresponding pinion in the adjacent row and therethrough transmitting movement to an adjacent stud and pinion in the same row, means for rotating said pinions, spiral meat holding tangs associated with said studs, a meat plate through which the tangs are adapted to be projected, and means associated with the meat plate and coöperating with the convolutions of the tangs for advancing the points of the tangs forwardly relative to the plane of the meat surface of the plate upon the rotation of the studs.

In testimony whereof I affix my signature.

JOSEPH HOPKINSON.